Patented May 24, 1949

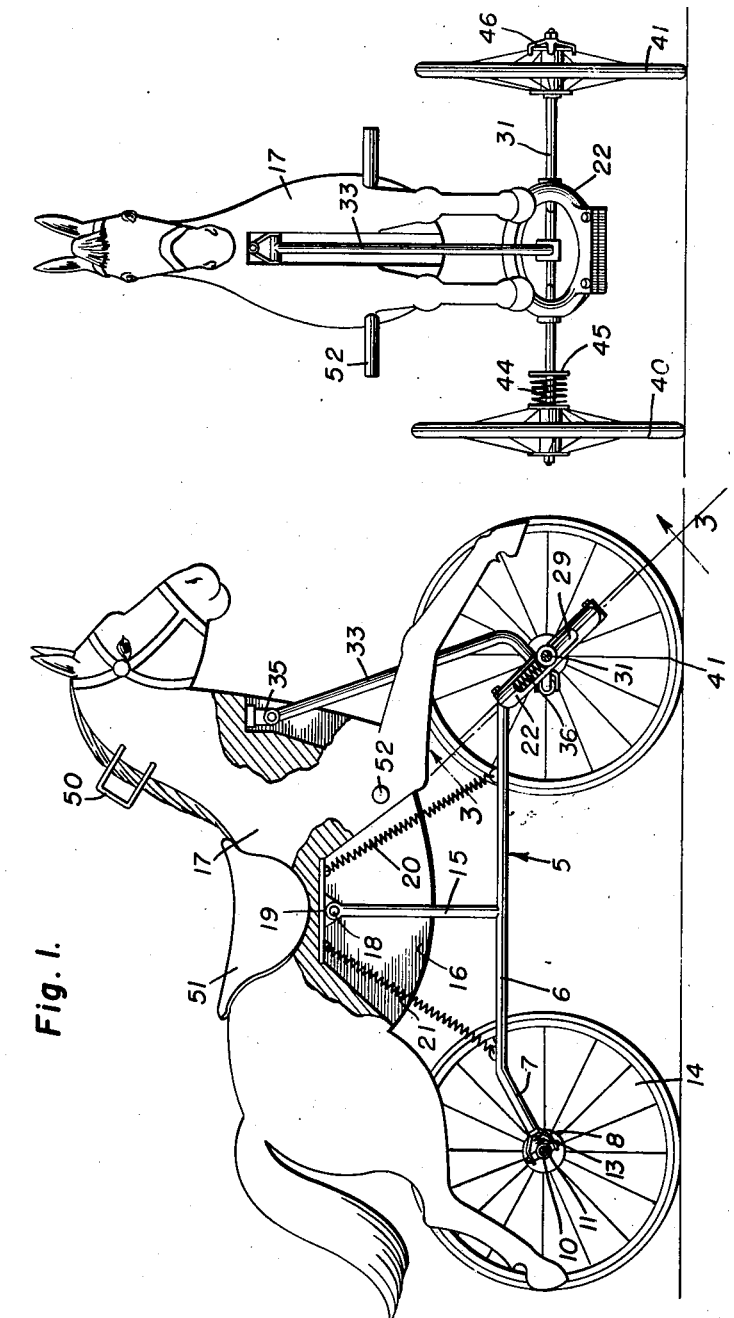

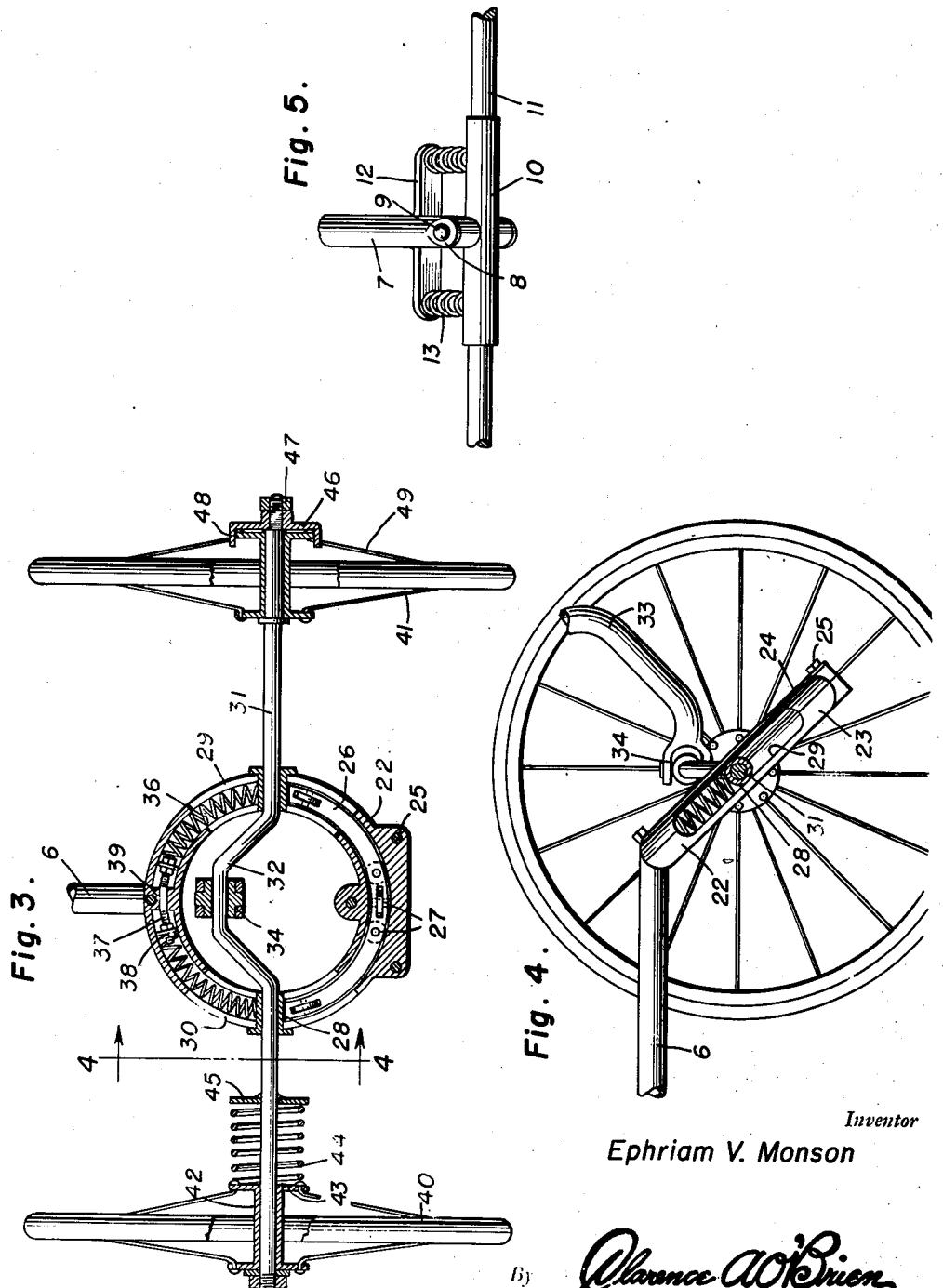

2,471,233

UNITED STATES PATENT OFFICE 2,471,233

MECHANICAL HORSE

Ephriam V. Monson, Salt Lake City, Utah

Application March 12, 1947, Serial No. 734,003

7 Claims. (Cl. 280—1.19)

The present invention relates to new and useful improvements in rocking horses and more particularly to a device of this character mounted on wheels together with a mechanism for driving the wheels by a manual operation of the horse by a child seated thereon.

A further object of the invention is to provide means for steering the horse by a lateral tilting movement thereof by the child seated on the horse and providing spring means for normally maintaining the horse in an upright position.

A further object of the invention is to provide a toy of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view with parts broken away and shown in section.

Figure 2 is a front elevational view.

Figure 3 is an enlarged transverse sectional view of the front end drive and steering means for the horse taken on a line 3—3 of Figure 1.

Figure 4 is a sectional view taken on a line 4—4 of Figure 3, and

Figure 5 is an enlarged detail of the pivotal connection for the rear end of the frame.

Referring now to the drawings in detail, wherein for the purpose of illustration I have disclosed a preferred embodiment of the invention the numeral 5 designates the frame generally for the rocking horse and which comprises a longitudinally extending bar 6 having its rear end curved downwardly as shown at 7 and provided with a yoke 8 at its rear end which is pivoted on a pin 9 extending transversely through a sleeve 10 and rear axle 11 at the center of the axle. The pin 9 is inclined rearwardly from a perpendicular position as shown to advantage in Figure 1 of the drawings whereby the frame 5 may oscillate from side to side.

A cross-bar 12 projects laterally from opposite sides of the yoke 8 at its junction with the rear end 7 of the bar 6 and between the ends of the bar 12 and the sleeve 10 are positioned coil springs 13 to yieldably hold the frame in its uppermost position.

Rear wheels 14 are journalled on the ends of the rear axle 11.

A post 15 rises from the central portion of the bar 6 and extends upwardly into a recess 16 in the lower body portion of a toy horse 17, the post being pivoted at its upper end to the horse by means of a pin 18 for forward and rearward rocking movement of the horse. The pin 18 is carried by a bracket 19 secured in the upper portion of the recess 16 and to the front and rear ends of the bracket are attached front and rear coil springs 20 and 21 having their lower ends connected respectively to the front and rear portions of the frame 5, the springs counterbalancing the rocking movement of the horse to yieldingly maintain the horse in a horizontal position on the frame.

The front end of the frame 5 is secured to one edge of a hollow ring 22 composed of annular sections 23 and 24 secured to each other by bolts 25, the ring sloping forwardly from the front end of the frame.

A semi-circular rod 26 is mounted in the lower portion of the ring for circumferential sliding movement on rollers 27 journalled on axes at right angles to each other in the rod 26, the rollers travelling in the hollow ring. The ends of the rod are welded or otherwise suitably secured to bearings 28 mounted to travel in slots 29 and 30 formed in diametrically opposite sides of the ring.

A crank shaft 31 is journalled in the bearings 28 with its crank 32 positioned in the center of the ring 22 and to which a connecting rod 33 is connected at its lower end by means of a bearing 34. The upper end of the connecting rod is connected to the front portion of the horse 17 by means of a universal or swivel joint 35.

A pair of coil springs 36 are positioned in the upper portion of the ring 22 with the lower end of each spring engaging one of the bearings 28 and with the upper ends of the spring adjustably connected to a double ended threaded stud 37 by means of nuts 38 to adjust the tension of the spring. The stud 37 is anchored in a web 39 in the upper portion of the ring.

Front wheels 40 and 41 are mounted at the ends of the drive shaft 31, the wheel 40 being freely journalled on the shaft and including a hub 42 having a flange 43 at its inner end and against which one end of a coil spring 44 is engaged with the other end of the spring bearing against a flange 45 welded or otherwise secured to the shaft 31.

The spring 44 provides a friction or semi-direct drive between the shaft 31 and the wheel 40 acting as a slip clutch.

The wheel 41 is provided with a direct drive engagement with the other end of shaft 31 by means of a plate 46 which is splined on the end of the shaft and secured thereto by a nut 47, the plate having inwardly projecting tongues 48 at its edges engaging the spokes 49 of the wheels.

The upper portion of the neck of the horse 17 is provided with hand grips 50 and a seat 51 is positioned on the back of the horse. Foot rests are shown at 52.

In the operation of the device, a child mounted on the horse may oscillate the horse forwardly and rearwardly whereby the connecting rod 33 connected to the crank 32 of the crank shaft 31 will rotate the gear crank shaft to drive the wheels 40 and 41.

The horse may be steered by the child tilting the horse from side to side whereby to partially rotate the forwardly sloping ring 22 which will cause the bearings 28 for the crank shaft 31 to slide in the slots 29 and 30 and since the slots are inclined as shown in Figures 1 and 4 of the drawings, the shaft 31 will also be inclined from its transverse position to move one of the wheels 40 or 41 forwardly of the other of said wheels, to thus cause a turning movement of the horse in a desired direction. During the steering or turning movement of the horse the friction drive spring 44 for the wheel 40 will provide a differential movement for the front wheels 40 and 41.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. In a rocking horse, front and rear pairs of ground wheels, front and rear axles for said front and rear pairs of wheels, one of said axles being a driving axle and having one wheel of the pair thereon fast thereto, a frame, means connecting said frame to said axles for lateral rocking movement including a member on said frame through which said driving axle slidably and rotatably extends and which is rockable by said frame about an axis transverse to said axle and in a plane oblique to the vertical to swing said axle for steering, a horse, means to mount the horse on the frame for lateral rocking therewith to rock said frame and including a pivot on which said horse is rockable forwardly and rearwardly, and a drive between said horse and driving axle operative by forward and rearward rocking of said horse.

2. In a rocking horse, front and rear pairs of ground wheels, front and rear axles for said front and rear pairs of wheels, one of said axles being a driving axle and having one wheel of the pair thereon fast thereto, a frame, means connecting said frame to said axles for lateral rocking movement including a member on said frame through which said driving axle slidably and rotatably extends and which is rockable by said frame about an axis transverse to said axle and in a plane oblique to the vertical to swing said axle for steering, a horse, means to mount the horse on the frame for lateral rocking therewith to rock said frame and including a pivot on which said horse is rockable forwardly and rearwardly, a drive between said horse and driving axle operative by forward and rearward rocking of said horse, and a slip clutch driving connection between said driving axle and the other wheel of the pair thereon.

3. In a rocking horse, front and rear pairs of ground wheels, front and rear axles for said front and rear pairs of wheels, one of said axles being a driving axle and having one wheel of the pair thereon fast thereto, a frame, means connecting said frame to said axles for lateral rocking movement including a member on said frame through which said driving axle slidably and rotatably extends and which is rockable by said frame about an axis transverse to said axle and in a plane oblique to the vertical to swing said axle for steering, a horse, means to mount the horse on the frame for lateral rocking therewith to rock said frame and including a pivot on which said horse is rockable forwardly and rearwardly, a drive between said horse and driving axle operative by forward and rearward rocking of said horse, and spring means connecting the last mentioned means to said frame for balancing the horse against forward and rearward rocking movement.

4. In a rocking horse, front and rear pairs of ground wheels, front and rear axles for said pairs of wheels, one of said axles being a driving axle and having one wheel of the pair thereon fast thereto, a frame, means connecting said frame to said axles for lateral rocking movement including a ring on said frame through which said driving axle extends diametrically and is laterally slidable and rotatable therein, said ring being rockable by said frame about an axis transverse to said axle and in a plane oblique to the vertical to swing said axle for steering, a horse, means to mount said horse on said frame for lateral rocking to rock said frame and including a pivot on which said horse is rockable forwardly and rearwardly, and a drive between said horse and said driving axle operative by forward and rearward rocking of said horse.

5. In a rocking horse, front and rear pairs of ground wheels, front and rear axles for said pairs of wheels, one of said axles being a driving axle and having one wheel of the pair thereon fast thereto, a frame, means connecting said frame to said axles for lateral rocking movement including a ring on said frame through which said driving axle extends diametrically and is laterally slidable and rotatable therein, said ring being rockable by said frame about an axis transverse to said axle and in a plane oblique to the vertical to swing said axle for steering, a horse, means to mount said horse on said frame for lateral rocking to rock said frame and including a pivot on which said horse is rockable forwardly and rearwardly, a drive between said horse and said driving axle operative by forward and rearward rocking of said horse, and spring means in said ring opposing rocking of said ring and thereby counterbalancing said frame and horse against lateral rocking movement.

6. In a rocking horse, front and rear pairs of ground wheels, front and rear axles for said pairs of wheels, one of said axles being a driving axle and having one wheel of the pair thereon fast thereto, a frame, means connecting said frame to said axles for lateral rocking movement including a ring on said frame through which said driving axle extends diameterically and is laterally slidable and rotatable therein, said ring being rockable by said frame about an axis transverse to said axle and in a plane oblique to the vertical to swing said axle for steering, a horse, means to mount said horse on said frame for lateral rocking to rock said frame and including a pivot on which said horse is rockable forwardly and rearwardly, and a drive between said horse and said driving axle operative by forward and rearward rocking of said horse and including a crank on said driving axle revolving in said ring.

7. In a rocking horse, front and rear pairs of ground wheels, front and rear axles for said pairs of wheels, one of said axles being a steering axle, a frame, means connecting said frame to said axles for lateral rocking movement including a ring on said frame through which said steering axle extends diametrically and is laterally slidable therein, said ring being rockable by said frame about an axis transverse to said axle and in a plane oblique to the vertical to swing said axle for steering, a horse, and means to mount said horse on said frame for lateral rocking to rock said frame.

EPHRIAM V. MONSON.

REFERENCES CITED

The following references are of record in the file of this patent:

UNITED STATES PATENTS

| Number | Name | Date |
|---|---|---|
| 330,007 | Foote | Nov. 10, 1885 |
| 1,160,569 | Bourdon | Nov. 16, 1915 |
| 1,548,973 | Beeler | Aug. 11, 1925 |